US011099277B2

(12) United States Patent
Ohev Zion et al.

(10) Patent No.: US 11,099,277 B2
(45) Date of Patent: Aug. 24, 2021

(54) APPARATUS, SYSTEM AND METHOD OF SYNCHRONIZATION BETWEEN GLOBAL NAVIGATION SATELLITE SYSTEM (GNSS) MEASUREMENTS AND INERTIAL MEASUREMENTS

(71) Applicant: INTEL CORPORATION, Santa Clara, CA (US)

(72) Inventors: Dan Ohev Zion, Ra'anana (IL); Ronny Ziss, Tel Aviv (IL); Gaby Prechner, Beer Yaakov (IL)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 16/194,660

(22) Filed: Nov. 19, 2018

(65) Prior Publication Data
US 2020/0158888 A1 May 21, 2020

(51) Int. Cl.
*G01S 19/47* (2010.01)
*G01S 19/37* (2010.01)

(52) U.S. Cl.
CPC .............. *G01S 19/47* (2013.01); *G01S 19/37* (2013.01)

(58) Field of Classification Search
CPC .......... G01S 19/47; G01S 19/49; G01S 19/37; G01S 19/20; G01C 21/165; G01C 21/28
USPC ...................................................... 342/357.3
See application file for complete search history.

(56) References Cited

U.S. PATENT DOCUMENTS

| 2013/0136154 A1* | 5/2013 | Chomal | H04B 1/7075 375/136 |
| 2017/0212248 A1* | 7/2017 | Bobye | B62D 6/003 |
| 2018/0054251 A1* | 2/2018 | Alex | G01S 19/54 |
| 2018/0188384 A1* | 7/2018 | Ramanandan | G01S 19/45 |

FOREIGN PATENT DOCUMENTS

CN         107202577 A   *  9/2017

* cited by examiner

*Primary Examiner* — Harry K Liu
(74) *Attorney, Agent, or Firm* — Shichrur & Co.

(57) ABSTRACT

Some demonstrative embodiments include apparatuses, devices, systems and methods of synchronizing time. For example, an apparatus may include a GNSS receiver to output GNSS measurements, and an output-timing signal including a plurality of pulses based on a clock of the GNSS receiver; an IMU to output inertial measurements, the IMU including a magnetometer to output magnetometer measurements; an antenna to emit an electromagnetic signal based on the output-timing signal, the electromagnetic signal to be measured by the magnetometer; and a processor to process the GNSS measurements and the inertial measurements, to detect in the magnetometer measurements one or more detected pulses of the output-timing signal, to determine a time delay between a clock of the IMU and the clock of the GNSS receiver based the detected pulses, and to adjust a time-base of the inertial measurements to a time-base of the GNSS measurements based on the time delay.

25 Claims, 5 Drawing Sheets

APPARATUS, SYSTEM AND METHOD OF SYNCHRONIZATION BETWEEN GLOBAL NAVIGATION SATELLITE SYSTEM (GNSS) MEASUREMENTS AND INERTIAL MEASUREMENTS

TECHNICAL FIELD

Embodiments described herein generally relate to synchronization between Global Navigation Satellite System (GNSS) measurements and inertial measurements.

BACKGROUND

A mobile device may determine its own location using various methods. For example, the mobile device may perform a Global Navigation Satellite System (GNSS) measurement, e.g., Global Positioning System (GPS), GALILEO, and the like.

Some mobile devices may utilize an inertial navigation system to determine the location of the device, e.g., in addition to the GNSS measurement.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
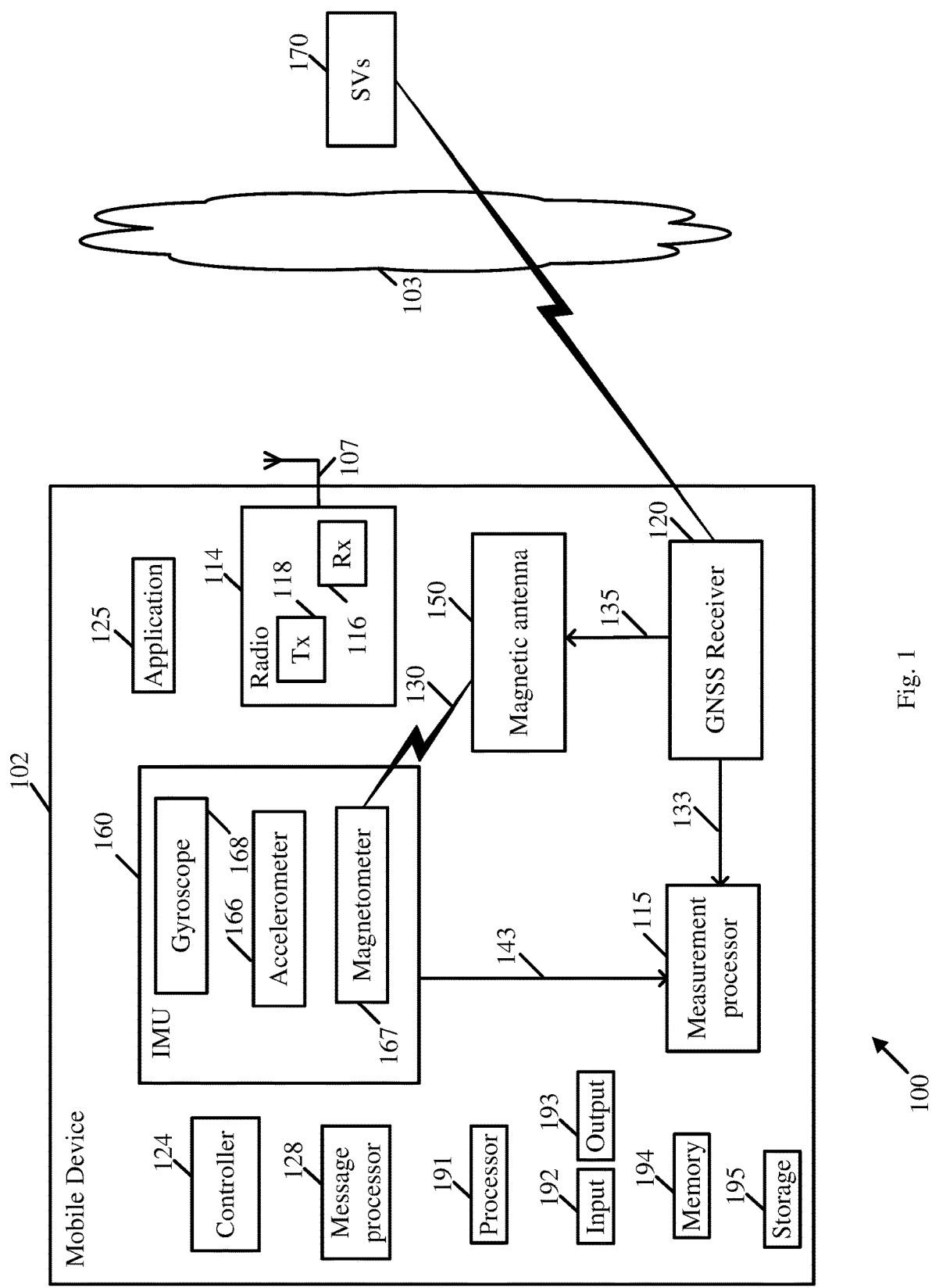
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications*, Dec. 7, 2016); and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that may be integrated with a computer, or a peripheral that may be attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

Reference may be now made to FIG. 1, which schematically illustrates a block diagram of a system 100, in accordance with some demonstrative embodiments.

As shown in FIG. 1, in some demonstrative embodiments, system 100 may include one or more mobile devices. For example, system 100 may include a mobile device 102.

In some demonstrative embodiments, device 102 may include, for example, a UE, an MD, a STA, an AP, a PC, a mobile computer, a laptop computer, an Ultrabook™ computer, a notebook computer, a tablet computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL)

device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include a wireless communication device, which may be capable of communicating content, data, information and/or signals via a wireless medium (WM) 103, .g., as described below. In some demonstrative embodiments, WM 103 may include, for example, a Global Navigation Satellite System (GNSS) Channel, a radio channel, a cellular channel, an RF channel, a WiFi channel, an IR channel, a Bluetooth (BT) channel, and the like. In other embodiments, device 102 may include any other type of device.

In other embodiments, WM 103 may include any other type of channel over any other frequency band.

In some demonstrative embodiments, device 102 may include one or more radios including circuitry and/or logic to perform wireless communication between device 102 and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, an mmWave band, a S1G band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In some demonstrative embodiments, device 102 may include a controller 124. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between device 102 and one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128 and radio 114 may be implemented as part of the chip or SoC.

In other embodiments, controller 124, message processor 128, and/or radio 114 may be implemented by one or more additional or alternative elements of device 102.

In some demonstrative embodiments, device 102 may include, operate as, perform the role of, and/or perform one or more functionalities of, one or more STAs. For example, device 102 may include at least one STA.

In some demonstrative embodiments, device 102 may be configured to perform a navigation, positioning and/or ranging measurement, e.g., as described below.

In some demonstrative embodiments, device 102 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information, for example, to determine an estimated location of device 102, e.g., with respect to a coordinate system, e.g., a World Geodetic System 1984 (WGS84), and/or a local coordinate system.

In one example, device 102 may include a Smartphone, which is located in a shop, e.g., in a shopping mall. According to this example, application 125 may use the range information to determine a relative location of device 102, for example, to receive sale offers from the shop.

In another example, device 102 may include a mobile device, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a measurement processor 115 configured to process one or more measurements, e.g., navigation and/or positioning measurements, for example, to estimate a location of device 102, e.g., as described below.

In some demonstrative embodiments, measurement processor 115 may include circuitry and/or logic, e.g., processor circuitry and/or logic, memory circuitry and/or logic, and/or any other circuitry and/or logic, configured to perform the functionality of measurement processor 115. Additionally or alternatively, one or more functionalities of measurement processor 115 may be implemented by logic, which may be executed by a machine and/or one or more processors, e.g., as described below.

In some demonstrative embodiments, at least part of the functionality of measurement processor 115 may be implemented as part of controller 124.

In other embodiments, the functionality of measurement processor 115 may be implemented as part of any other element of device 102.

In some demonstrative embodiments, device 102 may be configured to perform one or more positioning measurements, for example, using a navigation system including a combination ("fusion") of a GNSS receiver and an Inertial Measurement Unit (IMU) (also referred to as a GNSS-IMU navigation system), e.g., as described below.

In some demonstrative embodiments, the GNSS-IMU navigation system may enable implementation of, for example, a robust and/or an accurate, e.g., a highly accurate, navigation system, e.g., as described below.

In one example, the GNSS-IMU navigation system may be used, for example, as an aircraft navigation system, a guided weapon navigation system, a civil navigation system and/or as any other navigation system and/or technique.

In some demonstrative embodiments, device 102 may include a GNSS receiver 120 to output GNSS measurements 133, e.g., as described below.

In some demonstrative embodiments, GNSS receiver 120 may be implemented as part of, and/or may share one or more elements with, radio 114. In other embodiments, GNSS receiver 120 and radio 114 may be implemented by separate elements, modules and/or units.

In some demonstrative embodiments, GNSS receiver 120 may be configured to receive GNSS signals, for example, from one or more space vehicles (SVs) 170.

In some demonstrative embodiments, SVs 170 may include one or more satellites, e.g., GNSS satellites.

In some demonstrative embodiments, GNSS receiver 120 may be configured to output GNSS measurements 133, for example, based on the GNSS signals from SVs 170.

In one example, GNSS measurements 133 may include, e.g., a pseudo range, a delta range, and/or Doppler shifts, for received GNSS signals from SVs 170.

In another example, GNSS measurements 133 may include one or more measurements in the form of a navigation solution, e.g., an estimated position and/or am estimated velocity.

In some demonstrative embodiments, measurement processor 115 may utilize GNSS measurements 133 from GNSS receiver 120, for example, to determine a position, a time, and/or a velocity of device 102, e.g., as described below.

In some demonstrative embodiments, GNSS receiver 120 may provide a position estimation with high accuracy, e.g., with position errors in an order of a few meters, for example, if GNSS receiver 120 has a Line of Sight (LOS) visibility to at least four SVs 170.

In some demonstrative embodiments, the GNSS measurements 133 provided by GNSS receiver 120 may become unreliable, inaccurate, or even impossible, for example, if the LOS visibility is blocked by obstructions, e.g., a building, a tree, and the like, and/or when strong multipath exists in a GNSS channel.

In some demonstrative embodiments, GNSS receiver 120 may provide GNSS measurements 133, for example, once per second, and/or at any other rate.

In some demonstrative embodiments, GNSS measurements 133 may be time aligned to a time-base, e.g., an Epoch edge.

In some demonstrative embodiments, device 102 may include an IMU 160 configured to output inertial measurements 143, e.g., as described below.

In some demonstrative embodiments, IMU 160 may be part of an Inertial Navigation System (INS), and/or of any other inertial system.

In some demonstrative embodiments, both IMU 160 and GNSS receiver 120 may be included as part of the same device, e.g., device 102. For example, the GNSS-IMU navigation system may be enclosed in device 102.

In other embodiments, one or more components of the GNSS-IMU navigation system may be distributed among multiple or separate devices. For example, GNSS receiver 120 may be included as part of device 102, while IMU 160 may be part of another device, e.g., separate from device 102.

In some demonstrative embodiments, inertial measurements 143 may correspond to a position, an orientation, a movement and/or any other parameter, corresponding to device 102, e.g., as described below.

In some demonstrative embodiments, IMU 160 may include, for example, one or more gyroscopes 168 configured to output gyroscope measurements.

In some demonstrative embodiments, a gyroscope 168 may measure a velocity, for example, a rotational velocity, e.g., including gyroscope measurements relating to an orientation of device 102.

In some demonstrative embodiments, IMU 160 may include, for example, one or more accelerometers 166 configured to output accelerometer measurements.

In some demonstrative embodiments, an accelerometer 166 may measure an acceleration, e.g., a linear acceleration, for example, which may include accelerometer measurements relating to a movement of device 102.

In some demonstrative embodiments, IMU 160 may be implemented, for example, by one or more sensors, e.g., six complimentary sensors, arrayed on one or more axes, for example, on three orthogonal axes, e.g., as described below.

In some demonstrative embodiments, IMU 160 may include a first gyroscope 168 and a first accelerometer 166 on a first axis, a second gyroscope 168 and a second accelerometer 166 on a second axis, and/or a third gyroscope 168 and a third accelerometer 166 on a third axis.

In other embodiments, IMU 160 may include any other number and/or arrangement of inertial sensors in any other order and/or setting.

In some demonstrative embodiments, IMU 160 may include, for example, a magnetometer 167 configured to output magnetometer measurements.

In some demonstrative embodiments, magnetometer 167 may measure a magnetic field, e.g., an electromagnetic field, for example, to provide magnetometer measurements relating to a strength and/or a direction of one or more magnetic fields.

In one example, magnetometer 167 may include a 3-axis magnetic sensor.

In another example, magnetometer 167 may include an external 3-axis magnetic sensor, e.g., to be connected to IMU 160 via a connection interface.

In some demonstrative embodiments, IMU 160 may include any other additional or alternative sensor, e.g., configured to detect movement and/or a change in a position of device 102, for example, a barometer, a compass, a Micro Electro-Mechanical Systems (MEMS) sensor, a speedometer, a motion sensor, a 6 Degree of Freedom (DoF) sensor, a 9-axis MEMS sensor, and/or a location determination mechanism and/or algorithm.

In some demonstrative embodiments, inertial measurements 143 from IMU 160 may include, for example, the magnetometer measurements, the gyroscope measurements, and/or the accelerometer measurements.

In other embodiments, inertial measurements 143 from IMU 160 may include any other additional or alternative inertial measurements.

In some demonstrative embodiments, measurement processor 115 may estimate the location of device 102, for example, by utilizing inertial measurements 143, e.g., in addition to and/or instead of utilizing GNSS measurements 133 from GNSS receiver 120.

In some demonstrative embodiments, measurement processor 115 may measure a precise and/or relative movement of device 102, e.g., in a three dimensional (3D) space, for example, by utilizing inertial measurements 143.

In some demonstrative embodiments, IMU 160 may provide inertial measurements 143 from magnetometer 167, accelerometer 166, and/or gyroscope 168, e.g., in a time synchronized manner.

In some demonstrative embodiments, IMU 160 may provide inertial measurements 143 to measurement processor 115, e.g., as discrete measurements, for example, at a specific rate or frequency. Additionally or alternatively, some or all of the inertial measurements 143 may be provided to measurement processor 115 in one or more batches.

In other embodiments, IMU 160 may provide inertial measurements 143 to measurement processor 115, e.g., in any other manner and/or timing.

In some demonstrative embodiments, IMU 160 may run at a rate, which is between 50 Hertz (Hz) and 1000 Hz.

In other embodiments, IMU 160 may run at any other rate, e.g., a rate, which is less than 50 Hz or more that 1000 Hz.

In some demonstrative embodiments, a combination ("fusion") of inertial measurements 143 and GNSS measurements 133, e.g., in a GNSS-IMU navigation system, may be implemented according to one or more methods and/or techniques, e.g., as described below.

In some demonstrative embodiments, the combination inertial measurements 143 and GNSS measurements 133 may be implemented according to a loosely-coupled integration. For example, positions and velocities derived from GNSS measurements 133 may be merged as updates to position estimation information of IMU 160, for example, derived from inertial measurements 143, e.g., through a navigation Kalman filter.

In some demonstrative embodiments, the combination of inertial measurements 143 and GNSS measurements 133 may be implemented according to a tightly-coupled integration. For example, one or more Kalman filters, for example, including a centralized Kalman filter, may be implemented to integrate GNSS measurements 133, e.g., estimated pseudo-ranges, delta-range and/or Doppler shifts, from GNSS receiver 120, with inertial measurements 143, e.g., one or more of linear acceleration, angular velocity, position, velocity, and/or altitude information, from mechanization equations of IMU 160.

In some demonstrative embodiments, measurements provided by GNSS receiver 120 and IMU 160 may be combined, for example, to provide a technical solution in which GNSS techniques and inertial techniques may enhance each other to provide a powerful navigation solution, e.g., as described below.

In one example, when GNSS conditions are good, for example, if GNSS receiver 120 has a LOS visibility to a suitable number of SVs, e.g., at least four SVs 170, GNSS measurements 133 from GNSS receiver 120 may provide to measurement processor 115 an accurate position of device 102 and/or an accurate time. According to this example, measurement processor 115 may use the accurate position and/or the accurate time from GNSS measurements 133 of GNSS receiver 120 to calibrate biases and/or other imperfections of IMU 160.

In another example, when the GNSS conditions become poor, for example, if GNSS receiver 120 does not have a LOS visibility to a suitable number of SVs, e.g., at least four SVs 170, inertial measurements 143 from IMU 160 may provide a position solution to measurement processor 115, for example, instead of GNSS receiver 120, e.g., until GNSS conditions improve.

In some demonstrative embodiments, some implementations, use cases and/or scenarios may require a GNSS-IMU navigation system to have a time synchronization, e.g., a very tight time synchronization, between a time-base of GNSS measurements 133 and a time-base of inertial measurements 143, for example, a time synchronization of less than 1 millisecond (ms). For example, a performance of a GNSS-IMU navigation system may degrade, e.g., significantly, and/or a GNSS-IMU navigation solution may diverge, for example, if the time-base of GNSS measurements 133 and the time-base of inertial measurements 143 are not synchronized.

In one example, the GNSS-IMU navigation system may be required to have a relatively tight time synchronization, e.g., less than 1 ms, for example, when a tracked device has high dynamics, and/or when implementing a high dynamics application.

In one example, a high dynamics application may include an application where a tracked body, for example, device 102, has high dynamics. For example, a high dynamics application may include a human fitness tracking application, e.g., to be used in urban areas, where GNSS signal blockage and/or multipath may be frequent and usage of an IMU may be advantageous.

In some demonstrative embodiments, IMU 160 and GNSS receiver 120 may share a same clock and/or a same trigger signal, e.g., in order to synchronize the time-base of inertial measurements 143 to the time-base of GNSS measurements 133, e.g., an Epoch edge. However, a time synchronization error, e.g., a constant time synchronization error, may exist between the time-base of inertial measurements 143 and the time-base of GNSS measurements 133, for example, due to internal delays and/or other imperfections in implementation.

In some demonstrative embodiments, in some implementations, use cases and/or scenarios, it may be advantageous, e.g., or even mandatory, to measure the time synchronization error, e.g., so that the time synchronization error may be compensated, for example, as part of a GNSS-IMU combination and/or fusion algorithm, e.g., to determine a location of device 102.

In some demonstrative embodiments, in some implementations, use cases and/or scenarios, sharing clock signals and/or trigger signals between IMU 160 and GNSS receiver 120 may not be possible, e.g., due to hardware and/or software architecture, a cost limitation, a power limitation, and/or due to any other limitation.

In some demonstrative embodiments, in some implementations, use cases and/or scenarios, IMU 160 and GNSS receiver 120 may each have a separate time-base which may result in a time synchronization error between the time-base of inertial measurements 143 and the time-base of GNSS measurements 133, which may change over time and/or between operations of IMU 160 and/or GNSS receiver 120.

In some demonstrative embodiments, in some implementations, use cases and/or scenarios, it may be advantageous to estimate the time synchronization error, e.g., occasionally, for example, so that the time synchronization error may be compensated, e.g., occasionally, as part of the GNSS-IMU combination and/or fusion algorithm.

In some demonstrative embodiments, in some implementations, use cases and/or scenarios, measuring the time synchronization error may not be simple, for example, if an output from GNSS receiver 120, e.g., GNSS measurements 133, may be given at a sample rate of once per second. For example, this sample rate of once per second may not fulfill a Nyquist criteria for sampling, which may make measuring the time synchronization error even harder.

In one example, estimating the time synchronization error between the time-base of inertial measurements 143 and the time-base of GNSS measurements 133 by estimating the time synchronization error as another state in a Kalman Filter may not be effective, for example, since there may be no assurance that the time synchronization error is estimated accurately this way. For example, if the time synchronization error is large, the GNSS-IMU navigation system may diverge and/or the time synchronization error may not even be estimated.

In some demonstrative embodiments, device 102 may implement one or more mechanisms and/or techniques to provide effective solutions for measuring the time synchronization error, e.g., as described below.

In some demonstrative embodiments, device 102 may be configured to estimate the time synchronization error between the time-base of inertial measurements 143 and the time-base of GNSS measurements 133, e.g., as described below.

In some demonstrative embodiments, the time synchronization error between the time-base of inertial measurements 143 and the time-base of GNSS measurements 133 may be measured at different phases in a product life cycle, e.g., as described below.

In some demonstrative embodiments, the time synchronization error between the time-base of inertial measurements 143 and the time-base of GNSS measurements 133 may be measured during a development phase, e.g., one or more times.

In some demonstrative embodiments, the time synchronization error between the time-base of inertial measurements 143 and the time-base of GNSS measurements 133 may be measured during a factory calibration, e.g., of each unit in production.

In some demonstrative embodiments, the time synchronization error between the time-base of inertial measurements 143 and the time-base of GNSS measurements 133 may be measured during operation, for example, in case a delay between the time-base of inertial measurements 143 and the time-base of GNSS measurements is expected to change during operation, e.g., due to a specific implementation of a system. For example, a measurement procedure to determine the time synchronization error may be carried out occasionally, e.g., during a system's normal operation.

In some demonstrative embodiments, the time synchronization error may be measured during operation, for example, in case a GNSS receiver and an IMU are not synchronized, for example, if the GNSS receiver and the IMU do not share a common clock and/or common trigger signals. For example, the measurement procedure to determine the time synchronization error may be carried out occasionally, e.g., during the system's normal operation.

In some demonstrative embodiments, performing the measurement procedure occasionally may be done, for example, using an antenna, e.g., a small antenna, for example, a small magnetic loop, implemented inside the system, e.g., as described below.

In some demonstrative embodiments, device 102 may be configured to measure the time synchronization error between the time-base of inertial measurements 143 and the time-base of GNSS measurements 133, e.g., accurately, for example, even without requiring any use of mechanical setups and/or high-end equipment, for example, at any time, e.g., as described below.

In some demonstrative embodiments, device 102 may implement a technical solution which may utilize an output-timing signal 135 from GNSS receiver 120, e.g., a pulse per second (1 PPS) output signal, to synchronize a time between the time-base of inertial measurements 143 and the time-base of GNSS measurements 133, e.g., as described below.

In some demonstrative embodiments, output-timing signal 135 from GNSS receiver 120, e.g., the 1 PPS output signal, may be connected to an antenna 150, for example, a magnetic loop antenna, or any other antenna or element configured to generate a magnetic field, e.g., as described below.

In some demonstrative embodiments, antenna 150 may be configured to generate electromagnetic field pulses, which may be configured to be sensed by magnetometer 167, e.g., as described below.

In some demonstrative embodiments, the electromagnetic field pulses from antenna 150 based on the output-timing signal 135 from GNSS receiver 120 may be time aligned to an Epoch edge, for example, when GNSS receiver 120 has a position fix, e.g., as described below.

In some demonstrative embodiments, a time miss-alignment between a time base of, e.g., measurement sampling times of, magnetometer measurements of magnetometer 167 and the Epoch may be estimated, for example, by analyzing magnetometer samples in the magnetometer measurements, e.g., as described below.

In some demonstrative embodiments, accelerometers 166, magnetometer 167, and/or gyroscopes 168 may be synchronized to a same time-base, e.g., of a clock inside IMU 160. Therefore, a time miss-alignment between the magnetometer samples from magnetometer 167 and the Epoch may also represent the time synchronization error between the time-base of inertial measurements 143 and the time-base of GNSS measurements 133, e.g., as described below.

In some demonstrative embodiments, a solution implementing antenna 150, e.g., a small magnetic loop antenna, may allow implementation of a GNSS-IMU navigation system in a plurality of systems, for example, including systems where synchronization, e.g., a simple synchronization, between an IMU and a GNSS receiver may not be possible.

In some demonstrative embodiments, GNSS receiver 120 may output an output-timing signal 135 and GNSS measurements 133, e.g., as described below.

In some demonstrative embodiments, measurement processor 115 may be configured to process output-timing signal 135 and GNSS measurements 133 from GNSS receiver 120, e.g., as described below.

In some demonstrative embodiments, output-timing signal 135 may include a plurality of pulses, for example, based on a clock of GNSS receiver 120, e.g., as described below.

In some demonstrative embodiments, output-timing signal 135 may include a 1 PPS output signal, e.g., as described below.

In other embodiments, output-timing signal 135 may include any other signal, which is based on and/or aligned to the clock of GNSS receiver 120.

In some demonstrative embodiments, output-timing signal 135 may be Epoch-aligned, e.g., as described below.

In some demonstrative embodiments, antenna 150 may be configured to emit an electromagnetic signal 130, for example, based on output-timing signal 135, e.g., as described below.

In some demonstrative embodiments, antenna 150 may include a magnetic loop antenna, e.g., as described below.

In one example, antenna 150 may include a radio antenna, for example, in the form of a loop or a coil of a wire, tubing, and/or any or other electrical conductor, which may be suitable to emit a low frequency signal, e.g., the 1 PPS output signal.

In other embodiments, antenna 150 may include any other type of antenna or antenna-like element configured to output the electromagnetic signal 130 to in a way, which may generate a magnetic field configured to be measured by magnetometer 167.

In some demonstrative embodiments, electromagnetic signal 130 from antenna 150 may be configured to be measured by magnetometer 167, e.g., as described below.

In some demonstrative embodiments, magnetometer 167 may be configured to output the magnetometer measurements, for example, including the measurements corresponding to the magnetic field generated by electromagnetic signal 130, e.g., as described below.

In some demonstrative embodiments, measurement processor 115 may be configured to process inertial measurements 143, for example, including the magnetometer measurements, e.g., as described below.

In some demonstrative embodiments, measurement processor 115 may be configured to detect in the magnetometer measurements one or more detected pulses of output-timing signal 135, e.g., as described below.

In some demonstrative embodiments, measurement processor 115 may be configured to determine a time delay between a clock of IMU 160 and the clock of GNSS receiver 120, for example, based the detected pulses, e.g., as described below.

In some demonstrative embodiments, measurement processor 115 may be configured to determine the time delay based on a timing of the detected pulses in the magnetometer measurements, e.g., as described below.

In some demonstrative embodiments, measurement processor 115 may be configured to determine the time delay, for example, based on a comparison between a timing of the one or more detected pulses and a timing of one or more of the pulses of output-timing signal 135, e.g., as described below.

In some demonstrative embodiments, measurement processor 115 may be configured to determine the time delay based on a comparison between a rising edge of a detected pulse and a beginning of a pulse of output-timing signal 135, e.g., as described below.

In other embodiments, measurement processor 115 may determine the time delay based on any comparison between the detected pulse in the magnetometer measurement and the pulse of output-timing signal 135, and/or based on any other additional or alternative processing of the output-timing signal 135 and the detected pulses in the magnetometer measurements.

In some demonstrative embodiments, measurement processor 115 may be configured to adjust the time-base of inertial measurements 143 to the time-base of GNSS measurements 133, for example, based on the time delay, e.g., as described below.

In one example, adjusting the time base of inertial measurements 143 to the time-base of GNSS measurements 133 based on the time delay may allow measurement processor 115 to compensate the time synchronization error between the time base of inertial measurements 143 and the time-base of GNSS measurements 133, e.g., which may enable measurement processor 115 to determine more accurately a location of device 102.

In some demonstrative embodiments, measurement processor 115 may be configured to determine an estimated location of device 102 based on GNSS measurements 133 and inertial measurements 143, for example, based on the compensation of the time synchronization error between the time base of inertial measurements 143 and the time-base of GNSS measurements 133, e.g., as described below.

Figure 2:
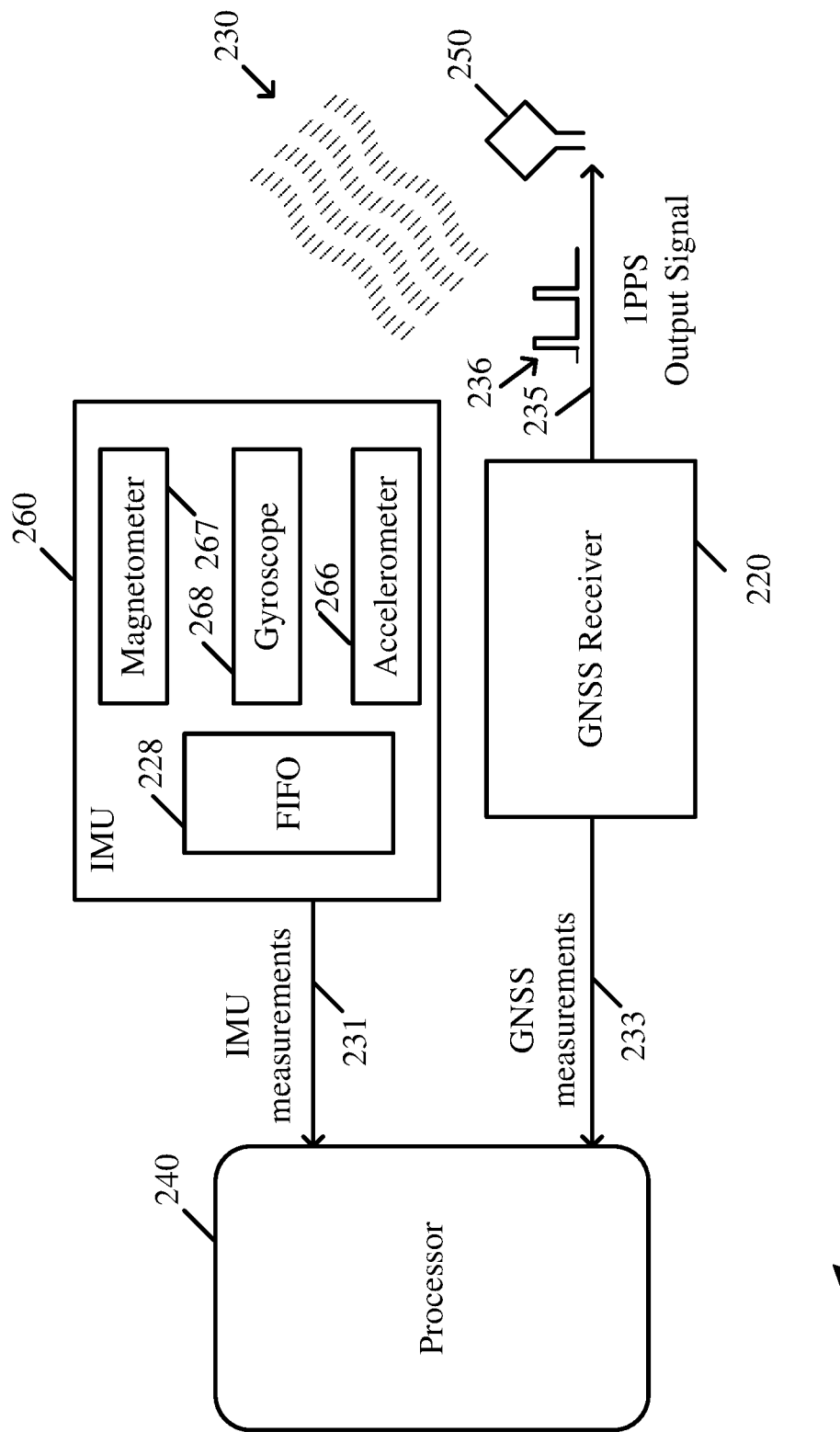
FIG. 2 is a schematic illustration of a navigation measurement scheme, in accordance with some demonstrative embodiments.

Reference is made to FIG. 2, which schematically illustrates a navigation measurement scheme 200, in accordance with some demonstrative embodiments.

In some demonstrative embodiments, as shown in FIG. 2, navigation measurement scheme 200 may include at least an IMU 260, a processor 240, and/or a GNSS Receiver 220. For example, IMU 260 may perform one or more operations and/or functionalities of IMU 160 (FIG. 1), processor 240 may perform one or more operations and/or functionalities of measurement processor 115 (FIG. 1), and/or GNSS Receiver 220 may perform one or more operations and/or functionalities of GNSS Receiver 120 (FIG. 1).

In some demonstrative embodiments, as shown in FIG. 2, IMU 260 may output inertial measurements 231.

In some demonstrative embodiments, as shown in FIG. 2, IMU 260 may include, for example, a magnetometer 267 to output magnetometer measurements, a gyroscope 268 to output gyroscope measurements, an accelerometer 266 to output accelerometer measurements, and/or a buffer 228, for example, a First in First out (FIFO) buffer, e.g., to buffer one or more measurements of inertial measurement 231.

In some demonstrative embodiments, inertial measurements 231 may include the magnetometer measurements, the gyroscope measurements, and/or the accelerometer measurements.

In some demonstrative embodiments, as shown in FIG. 2, GNSS receiver 220 may output GNSS measurements 233.

In some demonstrative embodiments, processor 240 may process GNSS measurements 233 and inertial measurements 231, e.g., from GNSS receiver 220 and IMU 260.

In some demonstrative embodiments, as shown in FIG. 2, GNSS receiver 220 may output an output-timing signal 235.

In some demonstrative embodiments, output-timing signal 235 may be aligned to the Epoch edge.

In some demonstrative embodiments, output-timing signal 235 may include a plurality of pulses, for example, based on a clock of GNSS receiver 220.

In some demonstrative embodiments, output-timing signal 235 may include a 1 PPS output signal.

In some demonstrative embodiments, output-timing signal 235 may include an electrical signal, e.g., having a width of less than one second and a rising edge 236, e.g., a sharply rising edge, which may be repeated, e.g., in an accurate form, for example, once per second.

In some demonstrative embodiments, rising edge 236 of output-timing signal 235 may be aligned to an Epoch, for example, when GNSS receiver 220 has a position fix.

In one example, there may be some misalignment, e.g., a random misalignment, between rising edge 236 of output-timing signal 235 and the Epoch. For example, there may be a random misalignment of up to tens of nanoseconds (ns), e.g., depending on a Signal to Noise Ratio (SNR) and/or multipath conditions.

In some demonstrative embodiments, as shown in FIG. 2, output-timing signal 235 may be connected to an antenna 250. For example, antenna 250 may perform one or more operations and/or functionalities of antenna 150 (FIG. 1).

In some demonstrative embodiments, antenna 250 may include a magnetic loop antenna or any other element configured to generate a magnetic field to be measured by magnetometer 267.

In some demonstrative embodiments, as shown in FIG. 2, antenna 250 may emit an electromagnetic signal 230, e.g., a magnetic field, for example, based on output-timing signal 235.

In some demonstrative embodiments, magnetometer 267 may measure the magnetic field generated by electromagnetic signal 230.

In some demonstrative embodiments, magnetometer 267 may output magnetometer measurements, for example, including the magnetometer measurements of the magnetic field based on electromagnetic signal 230.

In some demonstrative embodiments, processor 240 may process inertial measurements 231, for example, including the magnetometer measurements.

In some demonstrative embodiments, processor 240 may detect in the magnetometer measurements one or more detected pulses of output-timing signal 235.

In some demonstrative embodiments, processor 240 may determine a time delay between a clock of IMU 260 and the clock of GNSS receiver 220, for example, based the detected pulses, e.g., as described below.

In some demonstrative embodiments, processor 240 may determine the time delay based on a timing of the detected pulses in the magnetometer measurements.

In some demonstrative embodiments, processor 240 may determine the time delay based on a comparison between a timing of the detected pulses and a timing of one or more of the pulses of output-timing signal 235.

In some demonstrative embodiments, processor 240 may determine the time delay based on a comparison between a rising edge of a detected pulse and a beginning of a pulse 236 of output-timing signal 235.

In some demonstrative embodiments, processor 240 may adjust the time-base of inertial measurements 231 to the time-base of GNSS measurements 233, for example, based on the time delay.

In some demonstrative embodiments, processor 240 may be configured to determine an estimated location of device 102 (FIG. 1) based on GNSS measurements 233 and inertial measurements 231.

In some demonstrative embodiments, output-timing signal 235 may be connected to antenna 250, e.g., such that magnetometer 267 inside the IMU 260 may measure the magnetic field produced by antenna 250.

In some demonstrative embodiments, the rising edges of created pulses of the magnetic field generated by antenna 250 may be time aligned to the Epoch, for example, based on alignment of the pulse 236 of output-timing signal 235 to the Epoch.

In some demonstrative embodiments, GNSS measurements 233 may be time aligned to the Epoch.

In some demonstrative embodiments, samples of the magnetic field pulses measured by the magnetometer 267 may be analyzed by processor 240, e.g., 100 times per second or at any other frequency, to estimate a time delay between a pulse rising edge and the Epoch edge.

In some demonstrative embodiments, gyroscope 268 and accelerometer 266 inside IMU 260 may be time aligned to magnetometer 267, e.g., if gyroscope 268, accelerometer 266 and magnetometer 267 are synchronized and/or use a common clock.

In some demonstrative embodiments, the estimated time delay based on the detected pulses of output-timing signal 235 may represent a time synchronization error between GNSS measurements 233 and IMU measurements 231.

Figure 3:
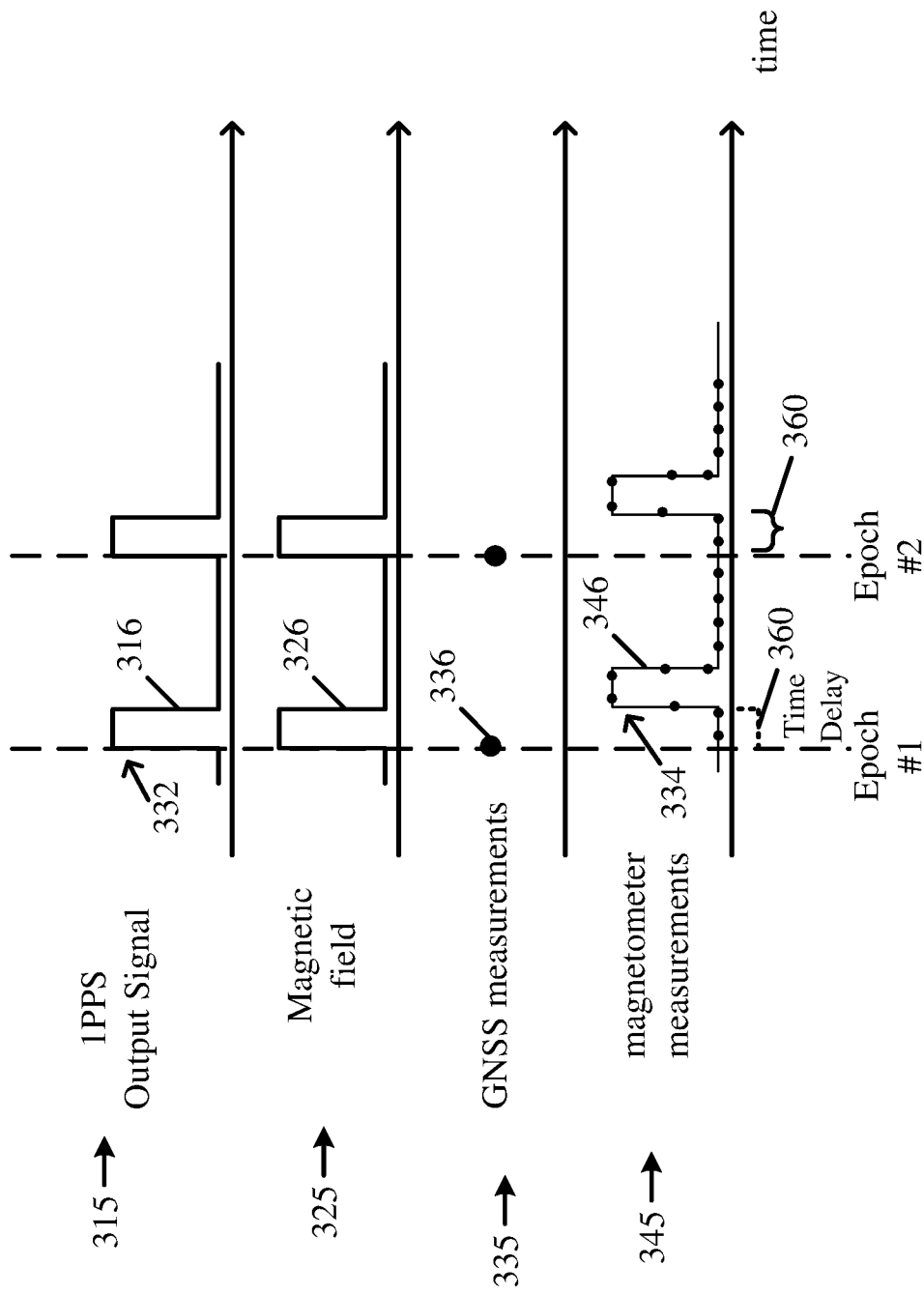
FIG. 3 is a schematic illustration of a time diagram depicting timing of Global Navigation Satellite System (GNSS) measurements and inertial measurements, in accordance with some demonstrative embodiments.

Reference is made to FIG. 3, which schematically illustrates timing of GNSS measurements and inertial measurements, in accordance with some demonstrative embodiments.

In some demonstrative embodiments, as shown in FIG. 3, a 1 PPS output signal 315 may include pulses 316, which may be Epoch-aligned. For example, 1 PPS output signal 315 may include output-timing signal 135 (FIG. 1) generated by GNSS receiver 120 (FIG. 1).

In some demonstrative embodiments, as shown in FIG. 3, a magnetic field 325 may be generated by an electromagnetic signal 326, which may be based on the pulses 316 of output-timing signal 315, and, accordingly, may be Epoch-aligned. For example, magnetic field 325 may be generated by antenna 150 (FIG. 1) based on output-timing signal 135 (FIG. 1), e.g., as described above.

In some demonstrative embodiments, as shown in FIG. 3, GNSS measurements 335 may be provided at times 336 and may be Epoch-aligned. For example, GNSS measurements 335 may include GNSS measurements 133 (FIG. 1) provided by GNSS receiver 120 (FIG. 1), e.g., as described above.

In some demonstrative embodiments, as shown in FIG. 3, magnetometer measurements 345 may include detected pulses 346, which may be based on a detection of the pulses 326. For example, inertial measurements 143 (FIG. 1) generated by magnetometer 167 (FIG. 1), may include one or more of the magnetometer measurements 345, which may be generated by magnetometer 167 (FIG. 1), for example, based on the pulses 326 in the magnetic field 325.

In some demonstrative embodiments, as shown in FIG. 3, detected pulses 346 may not be Epoch-aligned.

In some demonstrative embodiments, there may be a time delay 360 between detected pulses 346 and the Epoch. For example, time delay 360 may represent a time synchronization error between a time-base of GNSS measurements 133 (FIG. 1) and a time-base of inertial measurements 143 (FIG. 1).

In some demonstrative embodiments, measurement processor 115 (FIG. 1) may determine time delay 360 based on a timing of detected pulses 346.

In some demonstrative embodiments, measurement processor 115 (FIG. 1) may determine time delay 360, for example, based on a comparison between a timing of one or more detected pulses of detected pulses 346 and a timing of one or more pulses of output-timing signal 316.

In some demonstrative embodiments, measurement processor 115 (FIG. 1) may determine time delay 360, for example, based on a comparison between a rising edge 334 of a detected pulse of detected pulses 346 and a beginning of a corresponding pulse 332 of output-timing signal 316.

Figure 4:
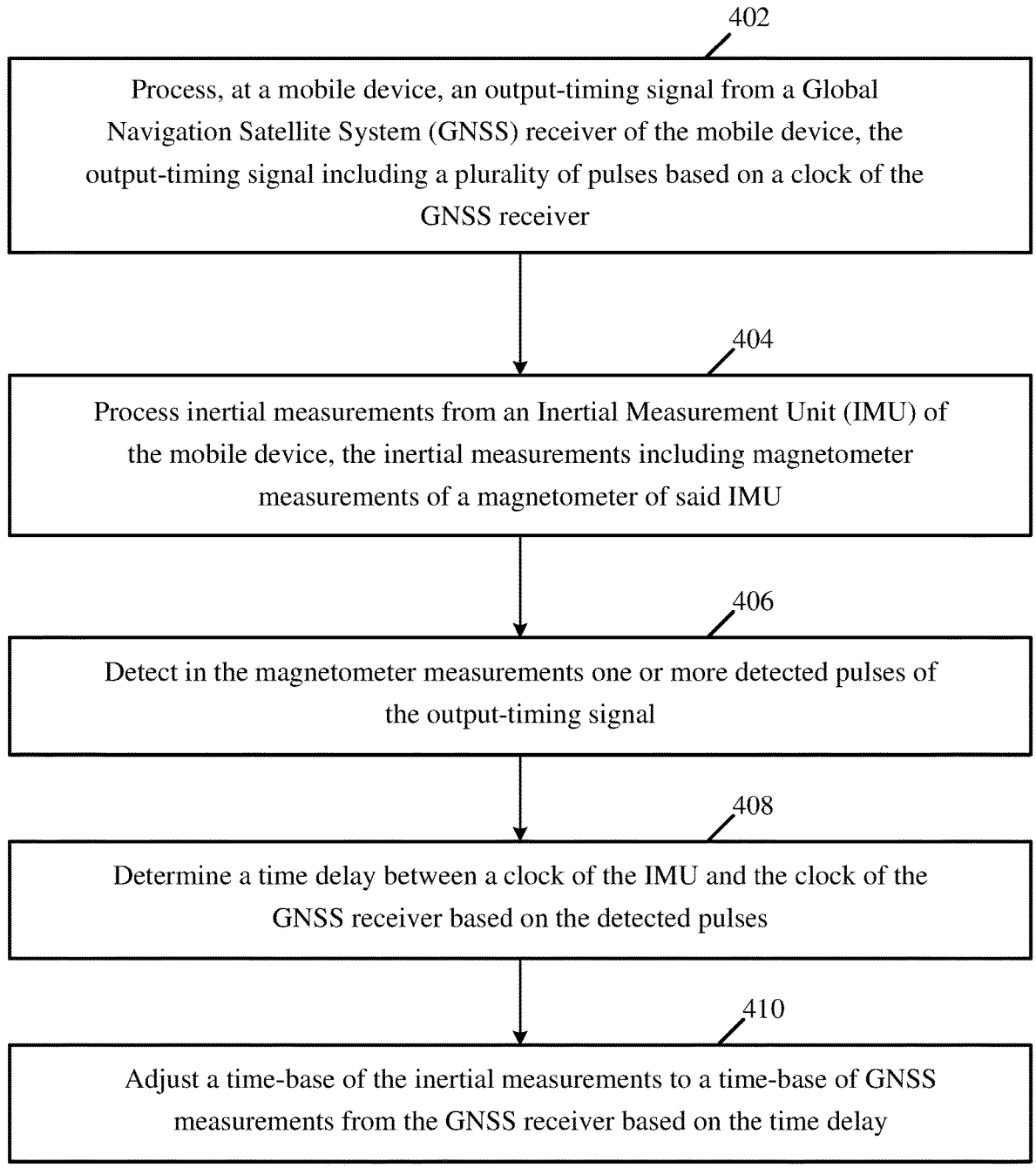
FIG. 4 is a schematic flow-chart illustration of a method of synchronizing between GNSS measurements and inertial measurements, in accordance with some demonstrative embodiments.

Reference is made to FIG. 4, which schematically illustrates a method of synchronization between GNSS measurements and inertial measurements. For example, one or more of the operations of the method of FIG. 4 may be performed by one or more elements of a system, e.g., system 100 (FIG. 1), for example, a mobile device, e.g., device 102 (FIG. 1); a controller, e.g., controller 124 (FIG. 1); a measurement processor, e.g., measurement processor 115 (FIG. 1); a GNSS receiver, e.g., GNSS receiver 120 (FIG. 1); an IMU, e.g., IMU 160 (FIG. 1); and/or an antenna, e.g., antenna 150 (FIG. 1).

As indicated at block 402, the method may include processing, e.g., at a mobile device, an output-timing signal from a GNSS receiver of the mobile device, the output-timing signal including a plurality of pulses based on a clock of the GNSS receiver. For example, controller 124 (FIG. 1) may be configured to cause, trigger, and/or control the mobile device implemented by device 102 (FIG. 1) to process output-timing signal 135 (FIG. 1) from GNSS receiver 120 (FIG. 1) of device 102 (FIG. 1), the output-timing signal 135 (FIG. 1) including a plurality of pulses based on a clock of GNSS receiver 120 (FIG. 1).

As indicated at block 404, the method may include processing inertial measurements from an inertial system of the mobile device, the inertial measurements including magnetometer measurements of a magnetometer of the inertial system. For example, controller 124 (FIG. 1) may be configured to cause, trigger, and/or control the mobile device implemented by device 102 (FIG. 1) to process inertial measurements 143 (FIG. 1) from IMU 160 (FIG. 1) of device 102 (FIG. 1), inertial measurements 143 (FIG. 1) including magnetometer measurements of magnetometer 167 (FIG. 1).

As indicated at block 406, the method may include detecting in the magnetometer measurements one or more detected pulses of the output-timing signal. For example, controller 124 (FIG. 1) may be configured to cause, trigger, and/or control the mobile device implemented by device 102 (FIG. 1) to detect in the magnetometer measurements one or more detected pulses 346 (FIG. 3) of output-timing signal 135 (FIG. 1).

As indicated at block 408, the method may include determining a time delay between a clock of the inertial system and the clock of the GNSS receiver based on timing of the detected pulses. For example, controller 124 (FIG. 1) may be configured to cause, trigger, and/or control the mobile device implemented by device 102 (FIG. 1) to determine a time delay 360 (FIG. 3) between a clock of IMU 160 (FIG. 1) and the clock of GNSS receiver 120 (FIG. 1) based on timing of detected pulses 346 (FIG. 3).

As indicated at block 410, the method may include adjusting a time-base of the inertial measurements to a time-base of GNSS measurements from the GNSS receiver based on the time delay. For example, measurement processor 115 (FIG. 1) may be configured to cause, trigger, and/or control the mobile device implemented by device 102 (FIG. 1) to adjust a time-base of inertial measurements 143 (FIG. 1) to a time-base of GNSS measurements 133 (FIG. 1) from GNSS receiver 120 (FIG. 1) based on time delay 360 (FIG. 3).

Figure 5:
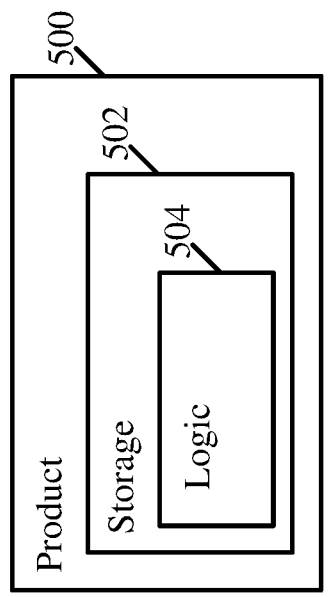
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine readable") non-transitory storage media 502, which may include computer-executable instructions, e.g., implemented by logic 504, operable to, when executed by at least one processor, for example, computer processor, enable the at least one processor to implement one or more operations at device 102 (FIG. 1), radio 114 (FIG. 1), transmitter 118 (FIG. 1), receiver 116 (FIG. 1), controller 124 (FIG. 1), message processor 128 (FIG. 1), measurement processor 115 (FIG. 1), IMU 160 (FIG. 1), GNSS receiver 120 (FIG. 1), and/or antenna 150 (FIG. 1), to cause device 102 (FIG. 1), radio 114 (FIG. 1), transmitter 118 (FIG. 1), receiver 116 (FIG. 1), controller 124 (FIG. 1), message processor 128 (FIG. 1), measurement processor 115 (FIG. 1), IMU 160 (FIG. 1), GNSS receiver 120 (FIG. 1), and/or antenna 150 (FIG. 1), to perform one or more operations, and/or to perform, trigger and/or implement one or more operations, communications and/or functionalities described above with reference to FIGS. 1, 2, 3, and/or 4, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a mobile device to process an output-timing signal from a Global Navigation Satellite System (GNSS) receiver of the mobile device, the output-timing signal comprising a plurality of pulses based on a clock of the GNSS receiver; process inertial measurements from an Inertial Measurement Unit (IMU) of the mobile device, the inertial measurements comprising magnetometer measurements of a magnetometer of the IMU; detect in the magnetometer measurements one or more detected pulses of the output-timing signal; determine a time delay between a clock of the IMU and the clock of the GNSS receiver based on the detected pulses; and adjust a time-base of the inertial measurements to a time-base of GNSS measurements from the GNSS receiver based on the time delay.

Example 2 includes the subject matter of Example 1, and optionally, wherein the output-timing signal comprises a One Pulse Per Second (1 PPS) output signal from the GNSS receiver.

Example 3 includes the subject matter of Example 1 or 2, and optionally, wherein the output-timing signal of the GNSS receiver is Epoch-aligned.

Example 4 includes the subject matter of any one of Examples 1-3, and optionally, wherein the apparatus is configured to determine the time delay based on a timing of the detected pulses.

Example 5 includes the subject matter of any one of Examples 1-4, and optionally, wherein the apparatus is configured to determine the time delay based on a comparison between a timing of the one or more detected pulses and a timing of one or more of the pulses of the output-timing signal.

Example 6 includes the subject matter of any one of Examples 1-5, and optionally, wherein the apparatus is configured to determine the time delay based on a comparison between a rising edge of a detected pulse and a beginning of a pulse of the output-timing signal.

Example 7 includes the subject matter of any one of Examples 1-6, and optionally, wherein the one or more inertial measurements comprise at least one of gyroscope measurements or accelerometer measurements.

Example 8 includes the subject matter of any one of Examples 1-7, and optionally, wherein the apparatus is configured to cause the mobile device to determine an estimated location of the mobile device based on the GNSS measurements and the inertial measurements.

Example 9 includes the subject matter of any one of Examples 1-8, and optionally, comprising a memory and a processor.

Example 10 includes a system comprising a mobile device, the mobile device comprising one or more antennas; a Global Navigation Satellite System (GNSS) receiver; an Inertial Measurement Unit (IMU); a memory; and a processor configured to cause the mobile device to process an output-timing signal from the GNSS receiver of the mobile device, the output-timing signal comprising a plurality of pulses based on a clock of the GNSS receiver; process inertial measurements from the IMU of the mobile device, the inertial measurements comprising magnetometer measurements of a magnetometer of the IMU; detect in the magnetometer measurements one or more detected pulses of the output-timing signal; determine a time delay between a clock of the IMU and the clock of the GNSS receiver based on the detected pulses; and adjust a time-base of the inertial measurements to a time-base of GNSS measurements from the GNSS receiver based on the time delay.

Example 11 includes the subject matter of Example 10, and optionally, wherein the output-timing signal comprises a One Pulse Per Second (1 PPS) output signal from the GNSS receiver.

Example 12 includes the subject matter of Example 10 or 11, and optionally, wherein the output-timing signal of the GNSS receiver is Epoch-aligned.

Example 13 includes the subject matter of any one of Examples 10-12, and optionally, wherein the processor is configured to determine the time delay based on a timing of the detected pulses.

Example 14 includes the subject matter of any one of Examples 10-13, and optionally, wherein the processor is configured to determine the time delay based on a comparison between a timing of the one or more detected pulses and a timing of one or more of the pulses of the output-timing signal.

Example 15 includes the subject matter of any one of Examples 10-14, and optionally, wherein the processor is configured to determine the time delay based on a comparison between a rising edge of a detected pulse and a beginning of a pulse of the output-timing signal.

Example 16 includes the subject matter of any one of Examples 10-15, and optionally, wherein the one or more inertial measurements comprise at least one of gyroscope measurements or accelerometer measurements.

Example 17 includes the subject matter of any one of Examples 10-16, and optionally, wherein the processor is configured to cause the mobile device to determine an estimated location of the mobile device based on the GNSS measurements and the inertial measurements.

Example 18 includes a method to be performed at a mobile device, the method comprising processing an output-timing signal from a Global Navigation Satellite System (GNSS) receiver of the mobile device, the output-timing signal comprising a plurality of pulses based on a clock of the GNSS receiver; processing inertial measurements from an Inertial Measurement Unit (IMU) of the mobile device, the inertial measurements comprising magnetometer measurements of a magnetometer of the IMU; detecting in the magnetometer measurements one or more detected pulses of the output-timing signal; determining a time delay between a clock of the IMU and the clock of the GNSS receiver based on the detected pulses; and adjusting a time-base of the inertial measurements to a time-base of GNSS measurements from the GNSS receiver based on the time delay.

Example 19 includes the subject matter of Example 18, and optionally, wherein the output-timing signal comprises a One Pulse Per Second (1 PPS) output signal from the GNSS receiver.

Example 20 includes the subject matter of Example 18 or 19, and optionally, wherein the output-timing signal of the GNSS receiver is Epoch-aligned.

Example 21 includes the subject matter of any one of Examples 18-20, and optionally, comprising determining the time delay based on a timing of the detected pulses.

Example 22 includes the subject matter of any one of Examples 18-21, and optionally, comprising determining the time delay based on a comparison between a timing of the one or more detected pulses and a timing of one or more of the pulses of the output-timing signal.

Example 23 includes the subject matter of any one of Examples 18-22, and optionally, comprising determining the time delay based on a comparison between a rising edge of a detected pulse and a beginning of a pulse of the output-timing signal.

Example 24 includes the subject matter of any one of Examples 18-23, and optionally, wherein the one or more inertial measurements comprise at least one of gyroscope measurements or accelerometer measurements.

Example 25 includes the subject matter of any one of Examples 18-24, and optionally, comprising determining an estimated location of the mobile device based on the GNSS measurements and the inertial measurements.

Example 26 includes a product comprising one or more tangible computer-readable non-transitory storage media comprising computer-executable instructions operable to, when executed by at least one processor, enable the at least one processor to cause a mobile device to process an output-timing signal from a Global Navigation Satellite System (GNSS) receiver of the mobile device, the output-timing signal comprising a plurality of pulses based on a clock of the GNSS receiver; process inertial measurements from an Inertial Measurement Unit (IMU) of the mobile device, the inertial measurements comprising magnetometer measurements of a magnetometer of the IMU; detect in the magnetometer measurements one or more detected pulses of the output-timing signal; determine a time delay between a clock of the IMU and the clock of the GNSS receiver based on the detected pulses; and adjust a time-base of the inertial measurements to a time-base of GNSS measurements from the GNSS receiver based on the time delay.

Example 27 includes the subject matter of Example 26, and optionally, wherein the output-timing signal comprises a One Pulse Per Second (1 PPS) output signal from the GNSS receiver.

Example 28 includes the subject matter of Example 26 or 27, and optionally, wherein the output-timing signal of the GNSS receiver is Epoch-aligned.

Example 29 includes the subject matter of any one of Examples 26-28, and optionally, wherein the instructions, when executed, cause the mobile device to determine the time delay based on a timing of the detected pulses.

Example 30 includes the subject matter of any one of Examples 26-29, and optionally, wherein the instructions, when executed, cause the mobile device to determine the time delay based on a comparison between a timing of the one or more detected pulses and a timing of one or more of the pulses of the output-timing signal.

Example 31 includes the subject matter of any one of Examples 26-30, and optionally, wherein the instructions, when executed, cause the mobile device to determine the time delay based on a comparison between a rising edge of a detected pulse and a beginning of a pulse of the output-timing signal.

Example 32 includes the subject matter of any one of Examples 26-31, and optionally, wherein the one or more inertial measurements comprise at least one of gyroscope measurements or accelerometer measurements.

Example 33 includes the subject matter of any one of Examples 26-32, and optionally, wherein the instructions, when executed, cause the mobile device to determine an estimated location of the mobile device based on the GNSS measurements and the inertial measurements.

Example 34 includes an apparatus of a mobile device, the apparatus comprising means for processing an output-timing signal from a Global Navigation Satellite System (GNSS) receiver of the mobile device, the output-timing signal comprising a plurality of pulses based on a clock of the GNSS receiver; means for processing inertial measurements from an Inertial Measurement Unit (IMU) of the mobile device, the inertial measurements comprising magnetometer measurements of a magnetometer of the IMU; means for detecting in the magnetometer measurements one or more detected pulses of the output-timing signal; means for determining a time delay between a clock of the IMU and the clock of the GNSS receiver based on the detected pulses; and means for adjusting a time-base of the inertial measurements to a time-base of GNSS measurements from the GNSS receiver based on the time delay.

Example 35 includes the subject matter of Example 34, and optionally, wherein the output-timing signal comprises a One Pulse Per Second (1 PPS) output signal from the GNSS receiver.

Example 36 includes the subject matter of Example 34 or 35, and optionally, wherein the output-timing signal of the GNSS receiver is Epoch-aligned.

Example 37 includes the subject matter of any one of Examples 34-36, and optionally, comprising means for determining the time delay based on a timing of the detected pulses.

Example 38 includes the subject matter of any one of Examples 34-37, and optionally, comprising means for determining the time delay based on a comparison between a timing of the one or more detected pulses and a timing of one or more of the pulses of the output-timing signal.

Example 39 includes the subject matter of any one of Examples 34-38, and optionally, comprising means for determining the time delay based on a comparison between a rising edge of a detected pulse and a beginning of a pulse of the output-timing signal.

Example 40 includes the subject matter of any one of Examples 34-39, and optionally, wherein the one or more inertial measurements comprise at least one of gyroscope measurements or accelerometer measurements.

Example 41 includes the subject matter of any one of Examples 34-40, and optionally, comprising means for determining an estimated location of the mobile device based on the GNSS measurements and the inertial measurements.

Example 42 includes an apparatus of a mobile device, the apparatus comprising a Global Navigation Satellite System (GNSS) receiver to output GNSS measurements, and an output-timing signal comprising a plurality of pulses based on a clock of the GNSS receiver; an Inertial Measurement Unit (IMU) configured to output inertial measurements, the IMU comprising a magnetometer configured to output magnetometer measurements; an antenna to emit an electromagnetic signal based on the output-timing signal, the electromagnetic signal configured to be measured by the magnetometer; and a processor to process the GNSS measurements and the inertial measurements, the processor to detect in the magnetometer measurements one or more detected pulses of the output-timing signal, to determine a time delay between a clock of the IMU and the clock of the GNSS receiver based the detected pulses, and to adjust a time-base of the inertial measurements to a time-base of the GNSS measurements based on the time delay.

Example 43 includes the subject matter of Example 42, and optionally, wherein the output-timing signal comprises a One Pulse Per Second (1 PPS) output signal from the GNSS receiver.

Example 44 includes the subject matter of Example 42 or 43, and optionally, wherein the output-timing signal of the GNSS receiver is Epoch-aligned.

Example 45 includes the subject matter of any one of Examples 42-44, and optionally, wherein the processor is configured to determine the time delay based on a timing of the detected pulses.

Example 46 includes the subject matter of any one of Examples 42-45, and optionally, wherein the processor is configured to determine the time delay based on a comparison between a timing of the one or more detected pulses and a timing of one or more of the pulses of the output-timing signal.

Example 47 includes the subject matter of any one of Examples 42-46, and optionally, wherein the processor is configured to determine the time delay based on a comparison between a rising edge of a detected pulse and a beginning of a pulse of the output-timing signal.

Example 48 includes the subject matter of any one of Examples 42-47, and optionally, wherein the IMU comprises at least one of a gyroscope to output gyroscope measurements or an accelerometer to output accelerometer measurements.

Example 49 includes the subject matter of any one of Examples 42-48, and optionally, wherein the processor is configured to determine an estimated location of the mobile device based on the GNSS measurements and the inertial measurements.

Example 50 includes the subject matter of any one of Examples 42-49, and optionally, wherein the antenna comprises a magnetic loop antenna.

Example 51 includes the subject matter of any one of Examples 42-50, and optionally, comprising the mobile device.

Example 52 includes a system comprising a mobile device, the mobile device comprising a memory; a Global Navigation Satellite System (GNSS) receiver to output GNSS measurements, and an output-timing signal comprising a plurality of pulses based on a clock of the GNSS receiver; an Inertial Measurement Unit (IMU) configured to output inertial measurements, the IMU comprising a magnetometer configured to output magnetometer measurements; an antenna to emit an electromagnetic signal based on the output-timing signal, the electromagnetic signal configured to be measured by the magnetometer; and a processor to process the GNSS measurements and the inertial measurements, the processor to detect in the magnetometer measurements one or more detected pulses of the output-timing signal, to determine a time delay between a clock of the IMU and the clock of the GNSS receiver based the detected pulses, and to adjust a time-base of the inertial measurements to a time-base of the GNSS measurements based on the time delay.

Example 53 includes the subject matter of Example 52, and optionally, wherein the output-timing signal comprises a One Pulse Per Second (1 PPS) output signal from the GNSS receiver.

Example 54 includes the subject matter of Example 52 or 53, and optionally, wherein the output-timing signal of the GNSS receiver is Epoch-aligned.

Example 55 includes the subject matter of any one of Examples 52-54, and optionally, wherein the processor is configured to determine the time delay based on a timing of the detected pulses.

Example 56 includes the subject matter of any one of Examples 52-55, and optionally, wherein the processor is configured to determine the time delay based on a comparison between a timing of the one or more detected pulses and a timing of one or more of the pulses of the output-timing signal.

Example 57 includes the subject matter of any one of Examples 52-56, and optionally, wherein the processor is configured to determine the time delay based on a comparison between a rising edge of a detected pulse and a beginning of a pulse of the output-timing signal.

Example 58 includes the subject matter of any one of Examples 52-57, and optionally, wherein the IMU comprises at least one of a gyroscope to output gyroscope measurements or an accelerometer to output accelerometer measurements.

Example 59 includes the subject matter of any one of Examples 52-58, and optionally, wherein the processor is configured to determine an estimated location of the mobile device based on the GNSS measurements and the inertial measurements.

Example 60 includes the subject matter of any one of Examples 52-59, and optionally, wherein the antenna comprises a magnetic loop antenna.

Example 61 includes a method to be performed at a mobile device, the method comprising outputting by a Global Navigation Satellite System (GNSS) receiver GNSS measurements, and an output-timing signal comprising a plurality of pulses based on a clock of the GNSS receiver; outputting by an Inertial Measurement Unit (IMU) inertial measurements comprising magnetometer measurements of a magnetometer of the IMU; emitting by an antenna an electromagnetic signal based on the output-timing signal, the electromagnetic signal configured to be measured by the magnetometer; and processing the GNSS measurements and the inertial measurements comprising detecting in the magnetometer measurements one or more detected pulses of the output-timing signal, determining a time delay between a clock of the IMU and the clock of the GNSS receiver based the detected pulses, and adjusting a time-base of the inertial measurements to a time-base of the GNSS measurements based on the time delay.

Example 62 includes the subject matter of Example 61, and optionally, wherein the output-timing signal comprises a One Pulse Per Second (1 PPS) output signal from the GNSS receiver.

Example 63 includes the subject matter of Example 61 or 62, and optionally, wherein the output-timing signal of the GNSS receiver is Epoch-aligned.

Example 64 includes the subject matter of any one of Examples 61-63, and optionally, comprising determining the time delay based on a timing of the detected pulses.

Example 65 includes the subject matter of any one of Examples 61-64, and optionally, comprising determining the time delay based on a comparison between a timing of the one or more detected pulses and a timing of one or more of the pulses of the output-timing signal.

Example 66 includes the subject matter of any one of Examples 61-65, and optionally, comprising determining the time delay based on a comparison between a rising edge of a detected pulse and a beginning of a pulse of the output-timing signal.

Example 67 includes the subject matter of any one of Examples 61-66, and optionally, wherein the IMU comprises at least one of a gyroscope to output gyroscope measurements or an accelerometer to output accelerometer measurements.

Example 68 includes the subject matter of any one of Examples 61-67, and optionally, comprising determining an estimated location of the mobile device based on the GNSS measurements and the inertial measurements.

Example 69 includes the subject matter of any one of Examples 61-68, and optionally, wherein the antenna comprises a magnetic loop antenna.

Example 70 includes an product comprising one or more tangible computer-readable non-transitory storage media comprising computer-executable instructions operable to, when executed by at least one processor, enable the at least one processor to cause a mobile device to output by a Global Navigation Satellite System (GNSS) receiver GNSS measurements, and an output-timing signal comprising a plurality of pulses based on a clock of the GNSS receiver; output by an Inertial Measurement Unit (IMU) inertial measurements comprising magnetometer measurements of a magnetometer of the IMU; emit by an antenna an electromagnetic signal based on the output-timing signal, the electromagnetic signal configured to be measured by the magnetometer; and process the GNSS measurements and the inertial measurements, the instructions, when executed, cause the mobile device to detect in the magnetometer measurements one or more detected pulses of the output-timing signal, to determine a time delay between a clock of the IMU and the clock of the GNSS receiver based the detected pulses, and to adjust a time-base of the inertial measurements to a time-base of the GNSS measurements based on the time delay.

Example 71 includes the subject matter of Example 70, and optionally, wherein the output-timing signal comprises a One Pulse Per Second (1 PPS) output signal from the GNSS receiver.

Example 72 includes the subject matter of Example 70 or 71, and optionally, wherein the output-timing signal of the GNSS receiver is Epoch-aligned.

Example 73 includes the subject matter of any one of Examples 70-72, and optionally, wherein the instructions, when executed, cause the mobile device to determine the time delay based on a timing of the detected pulses.

Example 74 includes the subject matter of any one of Examples 70-73, and optionally, wherein the instructions, when executed, cause the mobile device to determine the time delay based on a comparison between a timing of the one or more detected pulses and a timing of one or more of the pulses of the output-timing signal.

Example 75 includes the subject matter of any one of Examples 70-74, and optionally, wherein the instructions, when executed, cause the mobile device to determine the time delay based on a comparison between a rising edge of a detected pulse and a beginning of a pulse of the output-timing signal.

Example 76 includes the subject matter of any one of Examples 70-75, and optionally, wherein the IMU comprises at least one of a gyroscope to output gyroscope measurements or an accelerometer to output accelerometer measurements.

Example 77 includes the subject matter of any one of Examples 70-76, and optionally, wherein the instructions, when executed, cause the mobile device to determine an estimated location of the mobile device based on the GNSS measurements and the inertial measurements.

Example 78 includes the subject matter of any one of Examples 70-77, and optionally, wherein the antenna comprises a magnetic loop antenna.

Example 79 includes an apparatus of a mobile device, the apparatus comprising means for outputting by a Global Navigation Satellite System (GNSS) receiver GNSS measurements, and an output-timing signal comprising a plurality of pulses based on a clock of the GNSS receiver; means for outputting by an Inertial Measurement Unit (IMU) inertial measurements comprising magnetometer measurements of a magnetometer of the IMU; means for emitting by an antenna an electromagnetic signal based on the output-timing signal, the electromagnetic signal configured to be measured by the magnetometer; and means for processing the GNSS measurements and the inertial measurements comprising detecting in the magnetometer measurements one or more detected pulses of the output-timing signal, determining a time delay between a clock of the IMU and the clock of the GNSS receiver based the detected pulses, and adjusting a time-base of the inertial measurements to a time-base of the GNSS measurements based on the time delay.

Example 80 includes the subject matter of Example 79, and optionally, wherein the output-timing signal comprises a One Pulse Per Second (1 PPS) output signal from the GNSS receiver.

Example 81 includes the subject matter of Example 79 or 80, and optionally, wherein the output-timing signal of the GNSS receiver is Epoch-aligned.

Example 82 includes the subject matter of any one of Examples 79-81, and optionally, comprising means for determining the time delay based on a timing of the detected pulses.

Example 83 includes the subject matter of any one of Examples 79-82, and optionally, comprising means for determining the time delay based on a comparison between a timing of the one or more detected pulses and a timing of one or more of the pulses of the output-timing signal.

Example 84 includes the subject matter of any one of Examples 79-83, and optionally, comprising means for determining the time delay based on a comparison between a rising edge of a detected pulse and a beginning of a pulse of the output-timing signal.

Example 85 includes the subject matter of any one of Examples 79-84, and optionally, wherein the IMU comprises at least one of a gyroscope to output gyroscope measurements or an accelerometer to output accelerometer measurements.

Example 86 includes the subject matter of any one of Examples 79-85, and optionally, comprising means for determining an estimated location of the mobile device based on the GNSS measurements and the inertial measurements.

Example 87 includes the subject matter of any one of Examples 79-86, and optionally, wherein the antenna comprises a magnetic loop antenna.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a mobile device, the apparatus comprising:
    a Global Navigation Satellite System (GNSS) receiver to output GNSS measurements, and an output-timing signal comprising a plurality of pulses based on a clock of the GNSS receiver;
    an Inertial Measurement Unit (IMU) configured to output inertial measurements, the IMU comprising a magnetometer configured to output magnetometer measurements;
    an antenna to emit an electromagnetic signal based on the output-timing signal, the electromagnetic signal configured to be measured by the magnetometer; and
    a processor to process the GNSS measurements and the inertial measurements, the processor to detect in the magnetometer measurements one or more detected pulses of the output-timing signal, to determine a time delay between a clock of the IMU and the clock of the GNSS receiver based the detected pulses, and to adjust a time-base of the inertial measurements to a time-base of the GNSS measurements based on the time delay.

2. The apparatus of claim 1, wherein the output-timing signal comprises a One Pulse Per Second (1 PPS) output signal from the GNSS receiver.

3. The apparatus of claim 1, wherein the output-timing signal of the GNSS receiver is Epoch-aligned.

4. The apparatus of claim 1, wherein the processor is configured to determine the time delay based on a timing of the detected pulses.

5. The apparatus of claim 1, wherein the processor is configured to determine the time delay based on a comparison between a timing of the one or more detected pulses and a timing of one or more of the pulses of the output-timing signal.

6. The apparatus of claim 1, wherein the processor is configured to determine the time delay based on a comparison between a rising edge of a detected pulse and a beginning of a pulse of the output-timing signal.

7. The apparatus of claim 1, wherein the IMU comprises at least one of a gyroscope to output gyroscope measurements or an accelerometer to output accelerometer measurements.

8. The apparatus of claim 1, wherein the processor is configured to determine an estimated location of the mobile device based on the GNSS measurements and the inertial measurements.

9. The apparatus of claim 1, wherein the antenna comprises a magnetic loop antenna.

10. An apparatus comprising logic and circuitry configured to cause a mobile device to:
   process an output-timing signal from a Global Navigation Satellite System (GNSS) receiver of the mobile device, the output-timing signal comprising a plurality of pulses based on a clock of the GNSS receiver;
   process inertial measurements from an Inertial Measurement Unit (IMU) of the mobile device, the inertial measurements comprising magnetometer measurements of a magnetometer of the IMU;
   detect in the magnetometer measurements one or more detected pulses of the output-timing signal;
   determine a time delay between a clock of the IMU and the clock of the GNSS receiver based on the detected pulses; and
   adjust a time-base of the inertial measurements to a time-base of GNSS measurements from the GNSS receiver based on the time delay.

11. The apparatus of claim 10, wherein the output-timing signal comprises a One Pulse Per Second (1 PPS) output signal from the GNSS receiver.

12. The apparatus of claim 10 configured to determine the time delay based on a timing of the detected pulses.

13. The apparatus of claim 10 configured to determine the time delay based on a comparison between a timing of the one or more detected pulses and a timing of one or more of the pulses of the output-timing signal.

14. The apparatus of claim 10 configured to determine the time delay based on a comparison between a rising edge of a detected pulse and a beginning of a pulse of the output-timing signal.

15. The apparatus of claim 10, wherein the one or more inertial measurements comprise at least one of gyroscope measurements or accelerometer measurements.

16. The apparatus of claim 10 configured to cause the mobile device to determine an estimated location of the mobile device based on the GNSS measurements and the inertial measurements.

17. The apparatus of claim 10 comprising a memory and a processor.

18. A product comprising one or more tangible computer-readable non-transitory storage media comprising computer-executable instructions operable to, when executed by at least one processor, enable the at least one processor to cause a mobile device to:
   process an output-timing signal from a Global Navigation Satellite System (GNSS) receiver of the mobile device, the output-timing signal comprising a plurality of pulses based on a clock of the GNSS receiver;
   process inertial measurements from an Inertial Measurement Unit (IMU) of the mobile device, the inertial measurements comprising magnetometer measurements of a magnetometer of the IMU;
   detect in the magnetometer measurements one or more detected pulses of the output-timing signal;
   determine a time delay between a clock of the IMU and the clock of the GNSS receiver based on the detected pulses; and
   adjust a time-base of the inertial measurements to a time-base of GNSS measurements from the GNSS receiver based on the time delay.

19. The product of claim 18, wherein the output-timing signal comprises a One Pulse Per Second (1 PPS) output signal from the GNSS receiver.

20. The product of claim 18, wherein the instructions, when executed, cause the mobile device to determine the time delay based on a timing of the detected pulses.

21. The product of claim 18, wherein the instructions, when executed, cause the mobile device to determine the time delay based on a comparison between a timing of the one or more detected pulses and a timing of one or more of the pulses of the output-timing signal.

22. The product of claim 18, wherein the instructions, when executed, cause the mobile device to determine the time delay based on a comparison between a rising edge of a detected pulse and a beginning of a pulse of the output-timing signal.

23. The product of claim 18, wherein the one or more inertial measurements comprise at least one of gyroscope measurements or accelerometer measurements.

24. An apparatus of a mobile device, the apparatus comprising:
   means for processing an output-timing signal from a Global Navigation Satellite System (GNSS) receiver of the mobile device, the output-timing signal comprising a plurality of pulses based on a clock of the GNSS receiver;
   means for processing inertial measurements from an Inertial Measurement Unit (IMU) of the mobile device, the inertial measurements comprising magnetometer measurements of a magnetometer of the IMU;
   means for detecting in the magnetometer measurements one or more detected pulses of the output-timing signal;
   means for determining a time delay between a clock of the IMU and the clock of the GNSS receiver based on the detected pulses; and
   means for adjusting a time-base of the inertial measurements to a time-base of GNSS measurements from the GNSS receiver based on the time delay.

25. The apparatus of claim 24 comprising means for determining the time delay based on a timing of the detected pulses.

\* \* \* \* \*